Jan. 3, 1933.  J. S. PARSONS  1,893,180
ELECTRICAL DISTRIBUTION SYSTEM
Original Filed June 27, 1925   4 Sheets-Sheet 1
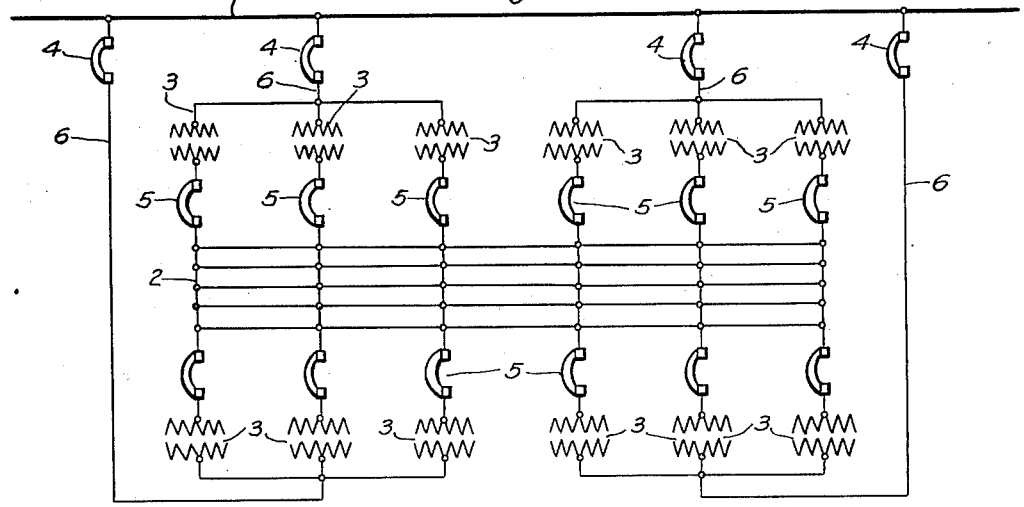
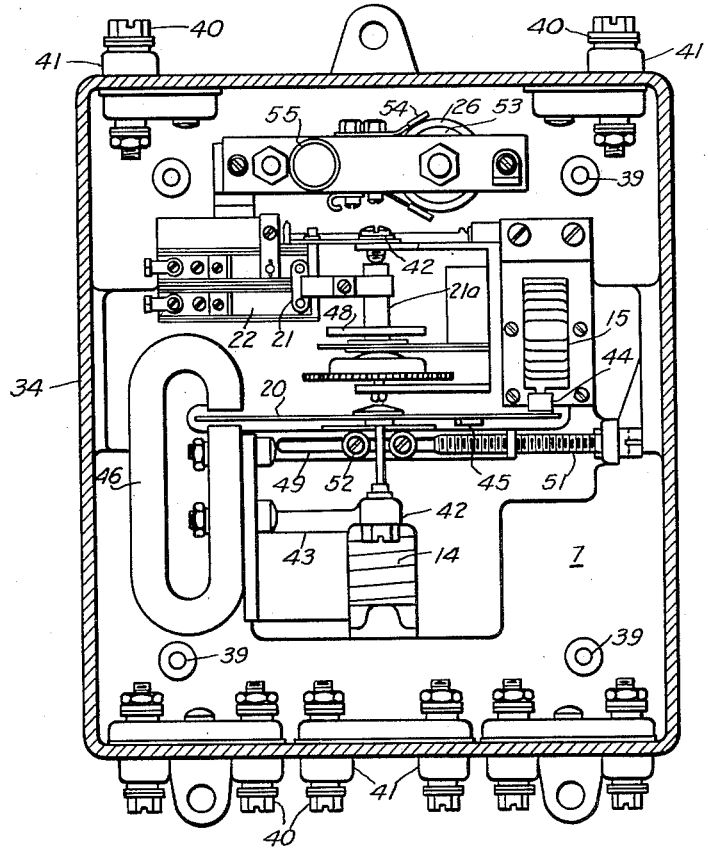
INVENTOR
John S. Parsons.
BY
ATTORNEY

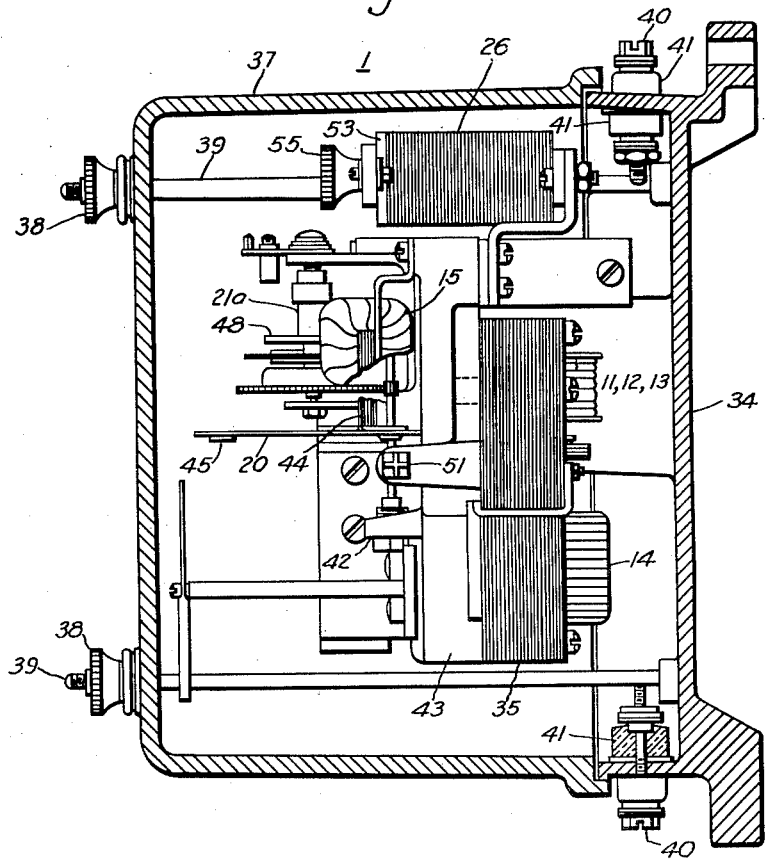

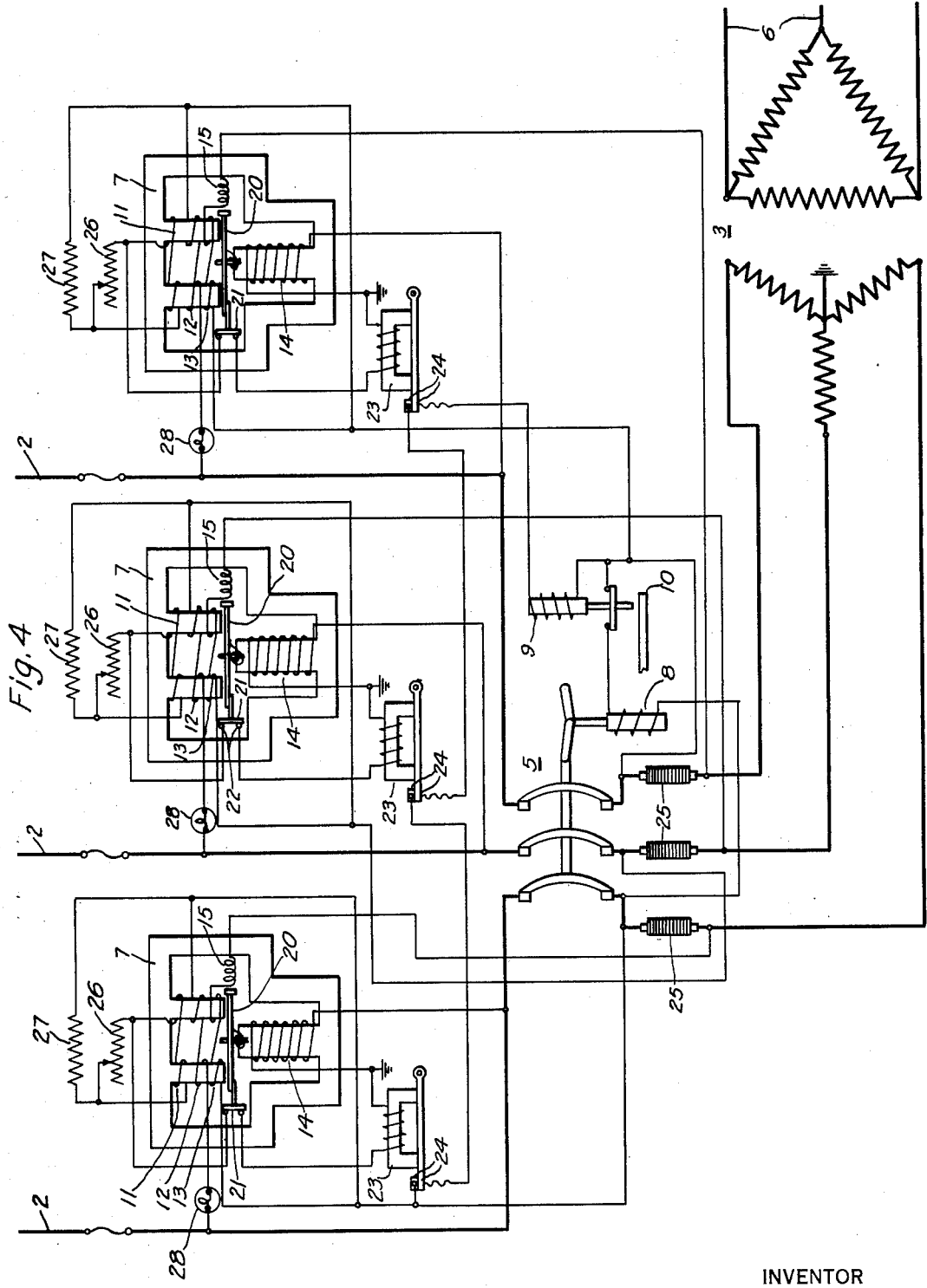

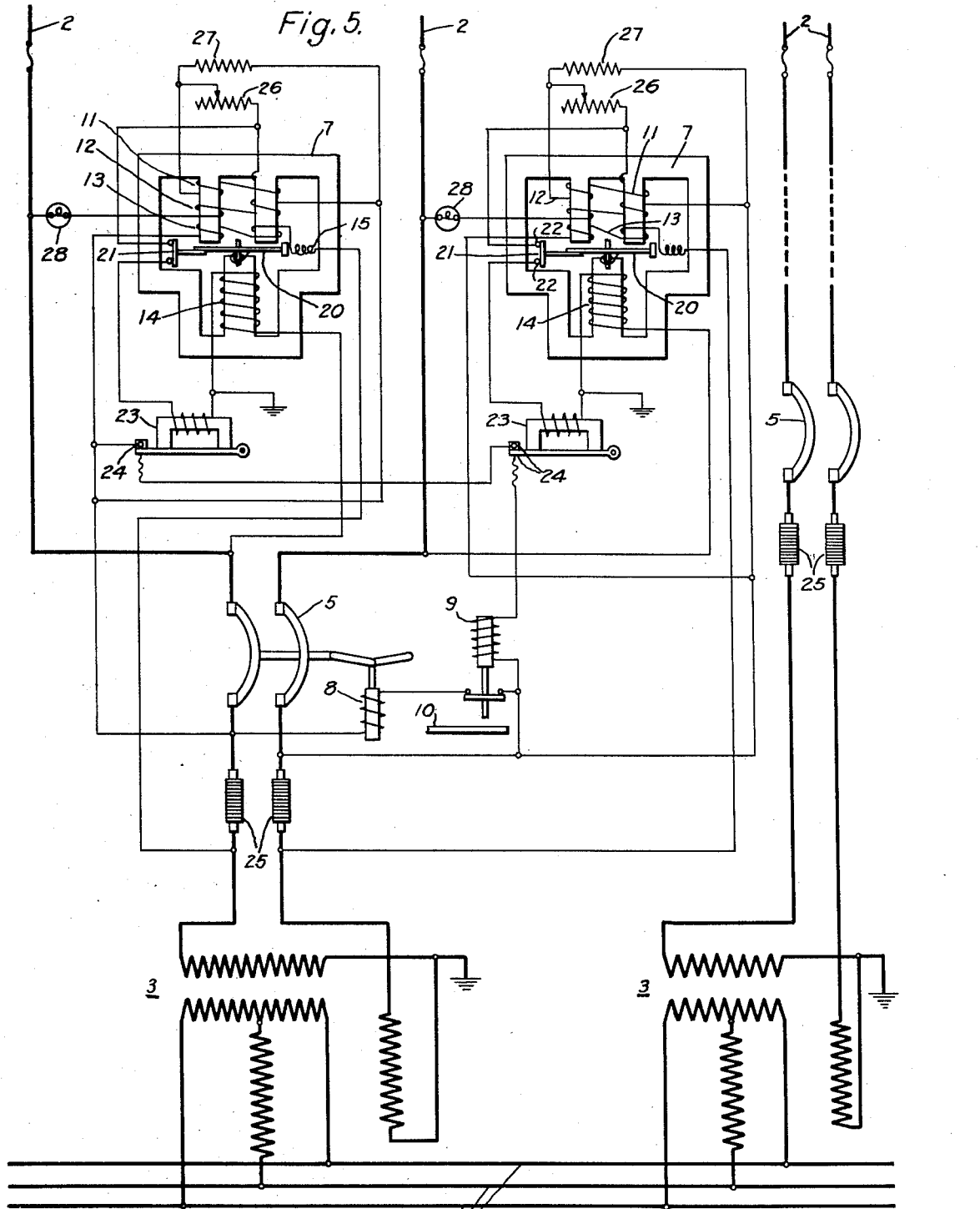

Patented Jan. 3, 1933

1,893,180

UNITED STATES PATENT OFFICE

JOHN S. PARSONS, OF EAST ORANGE, NEW JERSEY, ASSIGNOR TO WESTINGHOUSE ELECTRIC & MANUFACTURING COMPANY, A CORPORATION OF PENNSYLVANIA

ELECTRICAL DISTRIBUTION SYSTEM

Original application filed June 27, 1925, Serial No. 39,947. Divided and this application filed February 15, 1929. Serial No. 340,301.

My invention relates to low-voltage alternating-current distribution networks and more particularly to an improved protective relay for such networks.

The present invention is a division of my copending application Serial No. 39,947, filed June 27, 1925.

An object of my invention is to provide a relay for actuating the circuit interrupters disposed in the feeders of a network distribution system upon a reversal of energy in the respective feeders, and embodying means for opposing the operating torque of the relay, thereby constituting, in effect a reverse-current adjustment for the relay.

Another object of my invention is the provision of a relay, in a system of the above-mentioned type, for controlling an associated circuit-interrupter, that is responsive to a reverse-energy condition to open the interrupter, and responsive to phase relation of the voltages on opposite sides of the open interrupter contacts to close the interrupter, irrespective of the magnitude of the load connected to the network.

A further object of my invention is the provision of means for preventing periodic opening and closing, or "pumping", of a network relay under any and all circuit conditions.

Distribution systems of the type here involved usually comprise an interconnected network or load circuit, a plurality of transformers having the secondary windings thereof connected to the network and the primary windings thereof connected to a source of sources of power through suitable high-tension breakers at the respective sources. A circuit interrupter or network switch is disposed in each feeder and relays associated respectively with the interrupters control the opening and closing thereof.

In a system of this type, it is necessary that a faulty feeder be disconnected from the system at both ends. For example, if a short-circuit occurs on one feeder, the usual operation of the high-tension breaker in the generating station to disconnect the feeder from the station will not be sufficient, inasmuch as the feeder will be energized from the network by a reversed flow of energy through the transformer. This condition not only overloads the system but energizes the feeder so that repairs cannot be made. Therefore, in addition to the usual circuit-interrupter at the station end of each feeder, a circuit interrupter at the load end of the feeder is required. Preferably, the last-mentioned circuit-interrupter is disposed between the secondary winding of the network transformer and the network, thus disconnecting both the feeder and the transformer from the network in case a fault develops in either element of the system.

In accordance with my invention, the network interrupter is arranged to open automatically upon a relatively slight reversal of energy and to reclose automatically when the magnitude and phase relations of the voltages across the interrupter are correct. The interrupter may also be arranged to open upon the failure of the voltage of the system. Since the interrupter opens upon a slight reversal of energy, the transformer may be disconnected during periods of light loads by opening the station interrupter, thereby causing the transformer to be energized from the network. The reversal of energy caused by the energization of the transformer and feeder from the network results in opening the interrupter and completely isolating the feeder. The other feeders assume the load, so that the transformer and feeder losses in the system are reduced.

Further, in accordance with my invention, the network interrupter is controlled by a relay having voltage winding, a phasing winding and a current winding. The phasing winding of the relay is energized when the interrupter is open and cooperates with the voltage winding to operate the relay when the voltages on opposite sides of the interrupter are of a predetermined magnitude and phase relation. The current winding of the relay is energized when the interrupter is closed and cooperates with the voltage winding to maintain the relay in its operated position as long as energy traverses the interrupter in the normal direction.

The relay is also provided with a holding winding that is effective during periods of light load to maintain the relay closed. This holding winding constitutes the means for obtaining a reverse-current adjustment and differs from the relay holding magnet to be described later. It is the holding magnet that provides the anti-pumping or pump-proof features whereas the holding winding is utilized in the electrical reverse-current adjustment feature. Since the current and phasing windings of the relay are connected to portions of the circuit that are traversed by relatively large currents or subjected to relatively high voltages under certain conditions, means is provided for limiting the currents through the said windings.

For a clearer understanding of my invention, reference should be had to the accompanying drawings, in which Figure 1 is a diagrammatic view of an alternating-current distribution system with which my invention may be employed;

Figs. 2 and 3 are front and side views, respectively, partly in section, of the relay embodying my invention;

Fig. 4 is a diagrammatic view of a three-phase distribution system embodying my invention and employing the relays shown in Figs. 2 and 3;

Fig. 5 is a similar view of a two-phase system embodying my invention.

Referring to Fig. 1, the distribution system shown comprises a high-voltage supply bus 1, which may be one of the bus bars of a generating station, a low-voltage network 2, which may be that supplying the light and power load of a metropolitan area, and a plurality of step-down transformers 3 between the supply bus and the network circuit.

A circuit-interrupter 4 is disposed between each group of transformers and the supply bus 1. The circuit-interrupters 4 may be of the manually-controlled type or the usual overload interrupters arranged to open automatically in case of a short-circuit. Automatic circuit-interrupters 5 are disposed between each transformer 3 and the secondary network 2. The circuit-interrupters 4 are located at the station end of the feeder circuits 6, and the transformers 3 and the circuit-interrupters 5 are located at the load end thereof. The circuit-interrupters 5 are arranged to open automatically in case of the reversal of energy through the associated transformer 3, as would result if the circuit-interrupter 4 were opened, or if a fault occurred in the transformer 3 or in the feeder circuit 6. The opening function of the circuit-interrupter 5 is, therefore, responsive to the magnitude and phase position of the current flowing through the interrupter 5.

As shown more clearly in Fig. 4, a three-phase transformer 3 is connected to the feeder circuit 6, a three-pole circuit-interrupter 5 is disposed between said transformer and the load circuit 2, and three control relays 7 are connected to control the operation of said interrupter. Each of the automatic interrupters 5 in the parallel supply circuits shown in Fig. 1 is identical with that shown in Fig. 4, and, accordingly, the control circuits of only one interrupter are shown in detail in Fig. 5.

The circuit-interrupter 5 may have a closing coil 8 and a low-voltage device 9 adapted to cooperate with a latch member 10 to open the circuit-interrupter, which is normally latched in the closed position, in the well-known manner, as illustrated in United States Patent No. 1,431,956, issued October 17, 1922, to E. G. Johnson, as illustrated in the copending application of J. B. MacNeill, Serial No. 5,175, filed January 27, 1925. Instead of the low-voltage trip type of interrupter as shown, an interrupter having a shunt-trip device or other suitable trip device may be used.

The relays 7 are of the induction type, each having a holding winding 11, a phasing winding 12, a current winding 13 and a voltage winding 14. An auxiliary electromagnet or holding magnet 15 cooperates with the first-mentioned windings to control the armature 20 of the relay and to provide the "anti-pumping" feature. The armature 20 is provided with a contact 21 for engaging a stationary contact 22. An electromagnetic switch 23 is connected in series with the contact members 21 and 22 of the relay, and is provided with contacts 24. The contacts 24 of the three switches 23 associated with the interrupter 5 are connected in series with the low-voltage tripping device 9 of said interrupter.

Three reactive shunts 25 of a well-known type are connected in series circuit relation in the phase conductors connecting the secondary windings of the transformer 3 and the terminals of the circuit interrupter 5. The current windings 13 of the relays 7 are connected across the reactive shunts 25, as shown.

The shunts 25 are designed to saturate at a relatively low value of current, so that the reactive drop across the shunt is only proportional to the current for relatively small values of current. The energization of the current windings of the relay is, therefore, not proportionately increased when the shunt is traversed by an excessive current. Accordingly, the relays are responsive to relatively small values of current and are not damaged by short-circuits or continuous overloads in the distribution system.

The holding winding 11 of each relay is shunted by a variable resistor 26 and one terminal thereof is connected through a resistor 27 to the feeder circuit between the circuit-interrupter 5 and the transformer 3. The other terminal thereof is connected through the contacts 21 and 22 and the operating coil of the switch 23 to ground. Since the holding winding 11 is connected in series with the contacts 21 and 22 of the relay 7, it is not energized when the circuit interrupter 5 is open.

The phasing winding 12 is connected directly across the contacts of the circuit-interrupter 5 and is, therefore, only energized when said circuit-interrupter is open.

Inasmuch as the voltage across the contacts of the circuit-interrupter may be twice the normal voltage of the circuit, or even greater under certain conditions, a resistor 28, having a large positive temperature coefficient of resistance, is connected in series with the winding 12.

The resistor 28 is preferably a tungsten resistor of such size as to become incandescent at the maximum applied voltage. When incandescent, the resistor will have such high resistance as to limit the current through the phasing winding 12, although said winding is operatively energized when only a small voltage obtains across the break contacts of interrupter 5.

Referring to Figs. 2 and 3, the specific construction of the relay 7 comprises a base member 34 on which are mounted a core member 35 and the rotatable armature 20 controlled thereby. The elements of the relay are enclosed by a cover 37 which is secured to the base member 34 by threaded thumb nuts 38 engaging cover studs 39 extending through the cover. A series of terminals 40 are mounted on the base member 34 and are insulated therefrom by bushings 41. The terminals 40 are suitably connected to the windings of the relay but the connections are omitted from the drawings for the sake of clearness.

The armature member 20 is pivotally supported in bearings 42 mounted on a frame 43 that is, in turn, secured to the core 35 and the base 34. The edge of the armature 20 is disposed in the air gap between the opposed pole pieces of the core 35, as shown in Figs. 3 and 4. The armature contacts 21, 22 are shown in the closed position in Fig. 2 and the travel of the movable contact, and hence the armature, is limited in one direction by the engagement of a magnetizable element 44 secured to the armature with the electromagnet 15 and, in the other direction, by the engagement of a lug 45 on the armature 20 with a stop fastened to frame 43.

The bridging contact 21, cooperating with the stationary contact 22, is secured to a spindle 21a which is gear driven by the spindle of the armature member 20 through suitable gearing. The contact member 21 is normally held in engagement with the stationary contacts 22, when the relay is deenergized, by a spring 48. The movement of the armature 20 is restrained by the spring 48 and by the damping magnet 46.

The over-voltage adjustment of the relay is effected by the means 49, 50, 51 and 52 as described in application Serial No. 39,947 above referred to and shown in detail in Fig. 4 thereof.

An adjustable resistor 26 is provided for modifying the reverse-current setting of the relay and is connected, as shown in Fig. 4, in shunt relation to the holding winding 11. The adjustable resistor 26 comprises a coil of high-resistance wire wound on a suitable spool 53 and an adjustable contact member 54 engaging said coil and having screw-threaded engagement with an adjusting screw 55. Transverse movement of the contact member 54 is produced by turning the adjusting screw 55, which is journalled in the frame 43 of the relay, thus providing an adjustment of the resistance in the circuit of the holding winding 11.

The over-voltage adjustment 49, 50, etc. affects the torque exerted by both the holding winding 11 and the current winding 13 simultaneously, and the resistor 26 provides a means for adjusting the relative torques of the two windings, as desired.

When the relay 7 is deenergized, the spring 48 maintains the contacts 21 and 22 in engagement. When the voltage winding 14 and the phasing winding 12 are energized, the direction and magnitude of the torque on the armature 20 depends upon the phase relation between the currents traversing said windings.

In the system shown in Fig. 4, the voltage and phasing windings are so connected to the circuit as to close the contacts of the relay when the voltages across the interrupter 5 are of such relative magnitude and phase relation that the current which will flow after the interrupter closes will be of such magnitude and phase relation as to maintain the interrupter closed.

When the voltage winding 14 and the current winding 13 of the relay are energized, a torque is exerted on the armature member 20 that depends for its direction and magnitude upon the phase relation of the currents in windings 13 and 14. In the system shown in Fig. 4, the current winding 13 is energized as soon as the interrupter 5 is closed, and this operation short-circuits the phasing winding 12. However, the torque exerted by the current winding 13 is in such direction as to maintain the contact members of the relay closed as long as the associated interrupter 5 is traversed by energy in the normal direction.

The torque on the armature member 20, when the holding winding 11 is energized, also depends upon the phase relation of the currents in the windings 11 and 14. The current winding 13 is connected in series with the holding magnet 15 and the two windings cooperate to hold the contact members of the relay closed so long as the energy traverses the interrupter 5 in the normal direction. The holding magnet 15 exerts a relatively large torque upon the armature 20 when the load current is appreciable, providing the armature is in its operated position. If the armature has been actuated to a position in which the contacts 21 and 22 are disengaged, the holding magnet 15 exerts no torque on the armature, and the ampere-turns of the magnet are too small when the load current is small to have an appreciable effect.

By reason of the connection of the current winding 13 and the holding magnet 15 across the reactive shunt 25, the said windings may exert approximately the same torque at high values of load current as at ordinary values. However, the holding magnet is substantially non-operative below 25% of normal load, the contact members of the relay being held closed during the periods of light load by the current winding 13 and the holding winding 11 acting together with the voltage winding 14 and the spring 48.

Assuming that the circuit-interrupters 4 at the substation are open and the feeder circuits 6 deenergized, and the circuit-interrupters 5 are open, if one of the circuit-interrupters 4 is closed, the transformer or transformers 3 connected thereto is energized and the circuit for energizing the low-voltage device 9 of the circuit-interrupter 5 is closed. This circuit includes the contact members 24 of the electromagnetic switches 23, which are closed as soon as the transformer 3 is energized, since the contact members of the relays 7 are maintained closed by the spring 48 when the network 2 is deenergized. The contact members of the low-voltage device 9 close the circuit of the operating coil 8 of the circuit-interrupter 5. The contact members of the low-voltage device are mechanically opened by the closing of the interrupters, thereby interrupting the circuit of the closing coil 8, the interrupter being held closed by suitable latching mechanism as above pointed out.

The energization of the closing coil 8 closes the circuit-interrupter 5, thereby connecting the transformer 3 to the work circuit 2. From the foregoing description of the relay 7, it will be clear that the contact members 21, 22 of the relays 7 are initially held in engagement by the springs 48.

As soon as any feeder circuit 6 is energized, the phasing windings 12 of the relays 7 associated therewith are energized, as each of these windings is connected to one conductor of the feeder circuit across the contacts of the circuit interrupter 5. The current traversing the phasing winding 12 is, therefore, dependent upon the magnitudes and phase relation of the voltages on opposite sides of the open circuit interrupter 5 and, therefore, the contact members 21, 22 of the relays 7 are immediately opened if the voltage on the feeder circuit is so low that energy will not be fed to the work circuit. In the assumed case, the work circuit is deenergized and the phasing winding 12 of each relay 7, though energized, is ineffective on account of the deenergization of the cooperating voltage winding 14. The contact members are accordingly maintained closed by the spring 48.

When the circuit-interrupter 5 is closed, the phasing winding 12 becomes deenergized but the holding winding 11 and the voltage winding 14 are energized, the circuit of the first-mentioned winding includes the contact members 21 and 22 of the relay. The torque of the holding winding 11 is augmented by the torque exerted by the current winding 13 and the holding magnet 15, which are connected across the reactive shunt 25, if an appreciable load current traverses the interrupter contacts.

If a fault occurs in the feeder circuit 6, or if the switch 4 is opened, the reversal of energy through the interrupter 5 for feeding the short-circuit, or for magnetizing the transformer 3, causes the relays 7 to open their contact members.

The reversal of torques on the armature members 20 of the relays results from the reversal of the current through the windings when the flow of energy traversing the interrupter 5 is reversed. The opening of the circuit of any of the electromagnetic switches 23 interrupts the circuit of the low-voltage device 9, and the core member thereof strikes the latch 10 and opens the circuit-interrupter 5.

Since the opening of the circuit-interrupter 5 is effected by the deenergization of the low-voltage device 9, it is apparent that failure of the voltage on the entire distribution system will also cause the interrupter to be opened. However, this feature is not essential. It may be omitted, if desired, and an opening coil may be employed to trip the circuit-interrupter 5.

The operation of the circuit-interrupters 5 and the control relays associated therewith in the circuits that are in parallel with that shown in Fig. 4 is identical with that just described, and, consequently, it is unnecessary to describe the same in detail.

If the secondary network 2 is energized through only one of the feeder circuits and the load increases to the point where it is desirable to utilize another feeder circuit, the interrupter 4 in an idle feeder circuit is closed by the station operator. If the magnitudes and phase relation of the voltages on opposite sides of the associated open circuit-interrupter 5 are correct, the phasing windings 12 of the relays 7 cooperate with the respective voltage windings 14 to close the relay contacts, thereby closing the interrupter 5, irrespective of the load connected to the system.

If the voltage on the feeder circuit is too low or is out of phase, either by reason of the fact that it is generated by a source that is not in synchronism or that, in the course of repairs made on the polyphase feeder, the feeder conductors have been transposed, the phasing windings 12 cooperate with the respective voltage windings 14 to maintain the contact members of the relays 7 open and thereby prevent the closure of the circuit-interrupter 5. It is apparent that any number of feeder circuits may be operated in parallel, as the operation of the interrupters in the respective circuits is independent.

In a system of this kind, where an interrupter is automatically opened and reclosed by a single control organization, it is important to guard against the possibility of "pumping" of the interrupter. Since the operation of the control relays 7, when the interrupter is open, is dependent upon the voltage across the interrupter, and the operation of the relays 7, when the interrupter is closed, is dependent upon the current traversing the interrupter, it is conceivable that with a transformer and a load of certain impedance characteristics, the energization of the relays may be so changed by the closure of the interrupter that the latter will be opened, and reclosed periodically or "pump". I have entirely eliminated this possibility by the disposition and connection of the relay windings shown and by the use of the holding magnet 15 which provides a relatively large torque upon the armature member for normal values of current through the interrupter when the contact members are already closed.

The current winding 13 and the voltage winding 14 cooperate when the interrupter 5 is closed and tend to either maintain the interrupter 5 closed or to open it dependent upon the magnitude and phase position of the current traversing the interrupter 5. Thus, if the current is in the normal direction flowing from the transformer 3 to the network 2, the current winding 13 and the voltage winding 14 cooperate to produce a relay torque in a direction to maintain the interrupter 5 closed, but if a reverse current occurs a relay torque will be produced in a direction to open the interrupter 5.

The holding magnet 15, however, tends to maintain the relay closed regardless of the direction of the current to which it is responsive. The torque exerted to maintain it closed is approximately proportional to the square of the current up to the point of saturation and is independent of the phase position of such current.

The torque exerted by the current winding 13 and the voltage winding 14 is, however, substantially proportional to the first power of the current up to the point of saturation and is dependent upon the phase position of the current.

It is the cooperation of these two sets of forces or torques relating to the opening function of the interrupter 5 that produces the so-called anti-pumping feature which is especially emphasized in this invention.

In Fig. 5 is shown a two-phase distribution system of the same general character as the three-phase system shown in Fig. 4. The three-phase supply circuit 6 is connected through the transformers 3 and a plurality of parallel circuit-interrupters 5 to an interconnected low-voltage network. The circuit-interrupters 5 are identical in construction and operation with the circuit interrupter shown in Fig. 4, and the control relays 7 for controlling said interrupters are identical in construction and in their connection to the circuit with the relays shown in Fig. 4. One relay 7 is provided for each of the main circuit conductors connected to the terminals of the secondary winding of the transformer 3. Since the operation of the system shown in Fig. 5 is identical with that shown in Fig. 4, it is unnecessary to describe the same in detail, the system being shown to illustrate the adaptability of the described apparatus to a two phase type of distribution system.

The embodiments of my invention that I have described herein should be interpreted in an illustrative and not in a limiting sense, as many modifications will occur to those skilled in the art. Accordingly, I do not wish the scope of my invention to be limited, except as may be indicated in the appended claims.

I claim as my invention:

1. A relay comprising a magnetizable core member having salient opposed pole pieces, a pivoted armature member adapted to rotate in the air gap between said pole pieces, windings on said core member for actuating said armature member, a magnetizable lug mounted on said armature member to move therewith and a holding magnet in the path of travel of said lug.

2. An induction relay having a voltage and a current coil so connected as to produce a torque tending to operate or prevent the operation of said relay dependent upon the phase position of the current in the current coil with respect to the voltage applied to the voltage coil, and another coil adapted to cooperate with one of the said coils to produce a torque independent of the phase positions of said current and voltage and tending to prevent the operation of the relay.

3. An induction relay having a voltage and a current coil so adapted and connected as to produce a torque tending to operate or prevent the operation of said relay dependent upon the phase position of the current in the current coil with respect to the voltage applied to the voltage coil and another coil adapted to cooperate with said voltage coil to produce a torque independent of the phase positions of said current and voltage and tending to prevent the operation of the relay.

4. An induction relay having a voltage and a current coil adapted and connected to produce a torque tending to operate or prevent the operation of said relay dependent upon the phase position of the current in the current coil with respect to the voltage applied to the voltage coil, another coil arranged to cooperate with one of the said coils to produce a torque independent of the phase positions of said current and voltage and tending to prevent the operation of the relay, and means for adjusting the last-mentioned torque.

5. An induction relay having a voltage and a current coil so arranged and connected so as to produce a torque tending to operate or prevent the operation of said relay dependent upon the phase position of the current in the current coil with respect to the voltage applied to the voltage coil and another coil arranged to cooperate with said voltage coil to produce a torque independent of the phase positions of said current and voltage and tending to prevent the operation of the relay and means for adjusting the last-mentioned torque.

6. An induction relay having a voltage and a current coil adapted to produce a torque tending to operate or prevent the operation of said relay dependent upon the phase position of the current in the current with respect to the voltage applied to the voltage coil, and electrical reverse-current adjustment means including another coil adapted to cooperate with said voltage coil to produce a torque independent of the phase positions of said current and voltage and tending to prevent the operation of the relay, and means for adjusting the last-mentioned torque.

7. Control means including a relay having a core member, an armature member controlled thereby, an electrical reverse-current-adjustment means associated with said core member, two windings on said core member, a third winding cooperating with said two windings to actuate said armature member in accordance with the phase relations of the currents traversing the three windings, and means for first connecting one of said two windings in circuit and then the other.

8. An alternating-current-network relay appartus having an electrical reverse-current-adjustment means and an overvoltage-adjustment means characterized by the fact that the first-named means operates independently of the last-named means.

9. An alternating-current-network-relay apparatus having a reverse-current-adjustment means including a holding winding in combination with an impedance means, and an overvoltage-adjustment means characterized by the fact that the first-named means is effective independently of the last-named means.

10. In an electric circuit, an induction relay having a voltage and a current coil so adapted and connected as to produce a torque tending to operate or prevent the operation of said relay, dependent upon the phase position of the current in the current coil with respect to the voltage applied to the voltage coil, and another coil adapted to cooperate with one of the said coils to produce a torque independent of the phase positions of said current and voltage and tending to prevent the operation of the relay.

11. In an electric circuit, an induction relay having a voltage and a current coil adapted and connected so as to produce a torque tending to operate or prevent the operation of said relay, dependent upon the phase position of the current in the current coil with respect to the voltage applied to the voltage coil and another coil adapted to cooperate with said voltage coil to produce a torque independent of the phase positions of said current and voltage and tending to prevent the operation of the relay.

12. In an electric circuit, an induction relay having a voltage and a current coil adapted and connected so as to produce a torque tending to operate or prevent the operation of said relay, dependent upon phase position of the current in the current coil with respect to the voltage applied to the voltage coil, and another coil arranged to cooperate with one of the said coils to produce a torque independent of the phase positions of said current and voltage and tending to prevent the operation of the relay, and means for adjusting the last-mentioned torque.

13. In an electric circuit, an induction relay having a voltage and a current coil adapted to produce a torque tending to operate or prevent the operation of said relay, dependent upon the phase position of the current in the current coil with respect to the voltage applied to the voltage coil, and means, including said voltage coil, constituting an electrical reverse-current adjustment means.

In testimony whereof, I have hereunto subscribed my name this seventh day of February, 1929.

JOHN S. PARSONS.